US010450952B2

(12) United States Patent
Julien et al.

(10) Patent No.: US 10,450,952 B2
(45) Date of Patent: Oct. 22, 2019

(54) TURBOFAN ENGINE ASSEMBLY WITH GEARBOX

(71) Applicant: PRATT & WHITNEY CANADA CORP., Longueuil (CA)

(72) Inventors: Andre Julien, Ste-Julie (CA); Jean Thomassin, Ste-Julie (CA); Serge Dussault, Ste-Julie (CA)

(73) Assignee: Pratt & Whitney Canada Corp., Longueuil, Quebec (CA)

(*) Notice: Subject to any disclaimer, the term of this patent is extended or adjusted under 35 U.S.C. 154(b) by 429 days.

(21) Appl. No.: 15/406,989

(22) Filed: Jan. 16, 2017

(65) Prior Publication Data
US 2018/0202358 A1    Jul. 19, 2018

(51) Int. Cl.
| *F02K 5/00* | (2006.01) |
| *F02C 5/06* | (2006.01) |
| *F02C 9/18* | (2006.01) |
| *F02K 3/06* | (2006.01) |
| *F02C 7/36* | (2006.01) |
| *F02C 7/18* | (2006.01) |
| *F02C 5/02* | (2006.01) |
| *F01C 1/22* | (2006.01) |

(52) U.S. Cl.
CPC .................. *F02C 5/06* (2013.01); *F02C 5/02* (2013.01); *F02C 7/185* (2013.01); *F02C 7/36* (2013.01); *F02C 9/18* (2013.01); *F02K 3/06* (2013.01); *F01C 1/22* (2013.01); *F05D 2260/211* (2013.01); *F05D 2260/40311* (2013.01)

(58) Field of Classification Search
CPC ...... F02K 5/00–026; F23R 2900/03281; F02C 5/06–08
See application file for complete search history.

(56) References Cited

U.S. PATENT DOCUMENTS

| 2,168,726 | A | * | 8/1939 | Whittle ..................... F02K 5/02 123/41.56 |
| 3,691,999 | A |   | 9/1972 | Lechler |
| 4,038,816 | A |   | 8/1977 | Wright |

(Continued)

FOREIGN PATENT DOCUMENTS

| DE | 102009043721 | 3/2011 |
| EP | 3059987 | 8/2016 |

OTHER PUBLICATIONS

Kestutis C. Civinskas and Gerald A. Kraft, NASA Technical Memorandum, Preliminary evaluation of a Turbine/Rotary Combustion Compound Engine for a Subsonic transport, NASA TM X-71906, Mar. 1976.

(Continued)

*Primary Examiner* — Steven M Sutherland
*Assistant Examiner* — Rene D Ford
(74) *Attorney, Agent, or Firm* — Norton Rose Fulbright Canada L.L.P.

(57) ABSTRACT

A turbofan engine assembly including an internal combustion engine in fluid communication between a compressor and a turbine, the internal combustion engine having an engine shaft, a bypass duct surrounding the internal combustion engine, and a fan drivingly engaged to the engine shaft via a gearbox, the gearbox configured to increase an output speed of the fan relative to an input speed of the engine shaft.

20 Claims, 3 Drawing Sheets

(56) References Cited

U.S. PATENT DOCUMENTS

| | | | | |
|---|---|---|---|---|
| 4,251,987 | A | * | 2/1981 | Adamson .................. F02C 3/113 |
| | | | | 417/405 |
| 4,815,282 | A | * | 3/1989 | Wilkinson ............ F02B 37/001 |
| | | | | 60/247 |
| 4,996,839 | A | * | 3/1991 | Wilkinson ............ F02B 37/005 |
| | | | | 60/247 |
| 5,471,834 | A | * | 12/1995 | Kapich ................... F02B 53/08 |
| | | | | 60/269 |
| 5,692,372 | A | * | 12/1997 | Whurr ........................ F01C 1/22 |
| | | | | 60/226.1 |
| 7,314,035 | B2 | | 1/2008 | Akmandor et al. |
| 7,654,087 | B2 | * | 2/2010 | Ullyott .................... F01D 25/12 |
| | | | | 60/607 |
| 2007/0215326 | A1 | | 9/2007 | Schwarz |
| 2012/0141256 | A1 | | 6/2012 | Jacobsson |
| 2012/0198814 | A1 | * | 8/2012 | Hirshberg ................ F01N 5/02 |
| | | | | 60/204 |
| 2014/0338348 | A1 | * | 11/2014 | Pomerleau ................ F01C 1/22 |
| | | | | 60/761 |
| 2015/0260127 | A1 | * | 9/2015 | Wennerstrom .......... F02K 3/115 |
| | | | | 60/226.1 |
| 2015/0275749 | A1 | * | 10/2015 | Thomassin ............... F01C 1/22 |
| | | | | 60/605.1 |
| 2016/0245154 | A1 | | 8/2016 | Thomassin et al. |

OTHER PUBLICATIONS

European Search Report dated Jun. 14, 2018 in corresponding application No. 18151972.9.

NASA Lewis Research Center, Preliminary of a turbine/rotary combustion compound engine for a subsonic transport, NASA Technical Memorandum, publication date : Mar. 1, 1976, 59 p., document ID: 19760014112 ,United States, Cleveland, OH.

* cited by examiner

US 10,450,952 B2

TURBOFAN ENGINE ASSEMBLY WITH GEARBOX

TECHNICAL FIELD

The application relates generally to turbofan engine assemblies and, more particularly, to such assemblies including one or more internal combustion engine(s).

BACKGROUND OF THE ART

Various configurations of turbofan engine assemblies including internal combustion engines are known. For example, in some turbofan engine assemblies, a turbine drives the fan via a first shaft while the internal combustion engine drives the compressor(s) via a second shaft rotatable independently from the first shaft. In other configurations, the shaft of the internal combustion engine is engaged to the fan via a gearbox defining a speed reduction from the engine shaft to the fan, so that the fan rotates at a slower rotational speed than the shaft of the internal combustion engine. However, existing configurations may leave place for improvement, for example in terms of thermal efficiency and thrust specific fuel consumption of the engine assembly.

SUMMARY

In one aspect, there is provided a turbofan engine assembly comprising: an internal combustion engine in fluid communication between a compressor and a turbine, the internal combustion engine having an engine shaft; a bypass duct surrounding the internal combustion engine; and a fan drivingly engaged to the engine shaft via a gearbox, the gearbox configured to increase an output speed of the fan relative to an input speed of the engine shaft.

In another aspect, there is provided a turbofan engine assembly comprising: a compressor; a plurality of rotary internal combustion engines each including an engine rotor having three apex portions mounted for eccentric revolutions within an internal cavity defined in a housing, the internal cavity having an epitrochoid shape with two lobes, the rotary internal combustion engines having an inlet in fluid communication with an outlet of the compressor through at least one first passage of an intercooler; a turbine having an inlet in fluid communication with an outlet of the rotary internal combustion engines; a bypass duct surrounding the rotary internal combustion engines, compressor and turbine; and a fan configured to propel air through the bypass duct and through an inlet of the compressor, the fan drivingly engaged to a shaft of the rotary internal combustion engines via a gearbox, the gearbox defining a speed ratio of a rotational speed of the shaft of the rotary internal combustion engines on a rotational speed of the fan, the speed ratio being smaller than 1 so that the gearbox defines a speed increase from the shaft of the rotary internal combustion engines to the fan.

In a further aspect, there is provided a method of driving a fan of a turbofan engine assembly, the method comprising: rotating a shaft with an internal combustion engine of the turbofan engine assembly; and driving the fan with the shaft of the internal combustion engine via a gearbox of the turbofan engine assembly, the gearbox configured so that the fan is rotated at a greater rotational speed than that of the shaft.

DESCRIPTION OF THE DRAWINGS

Reference is now made to the accompanying figures in which.

DETAILED DESCRIPTION

Figure 1:
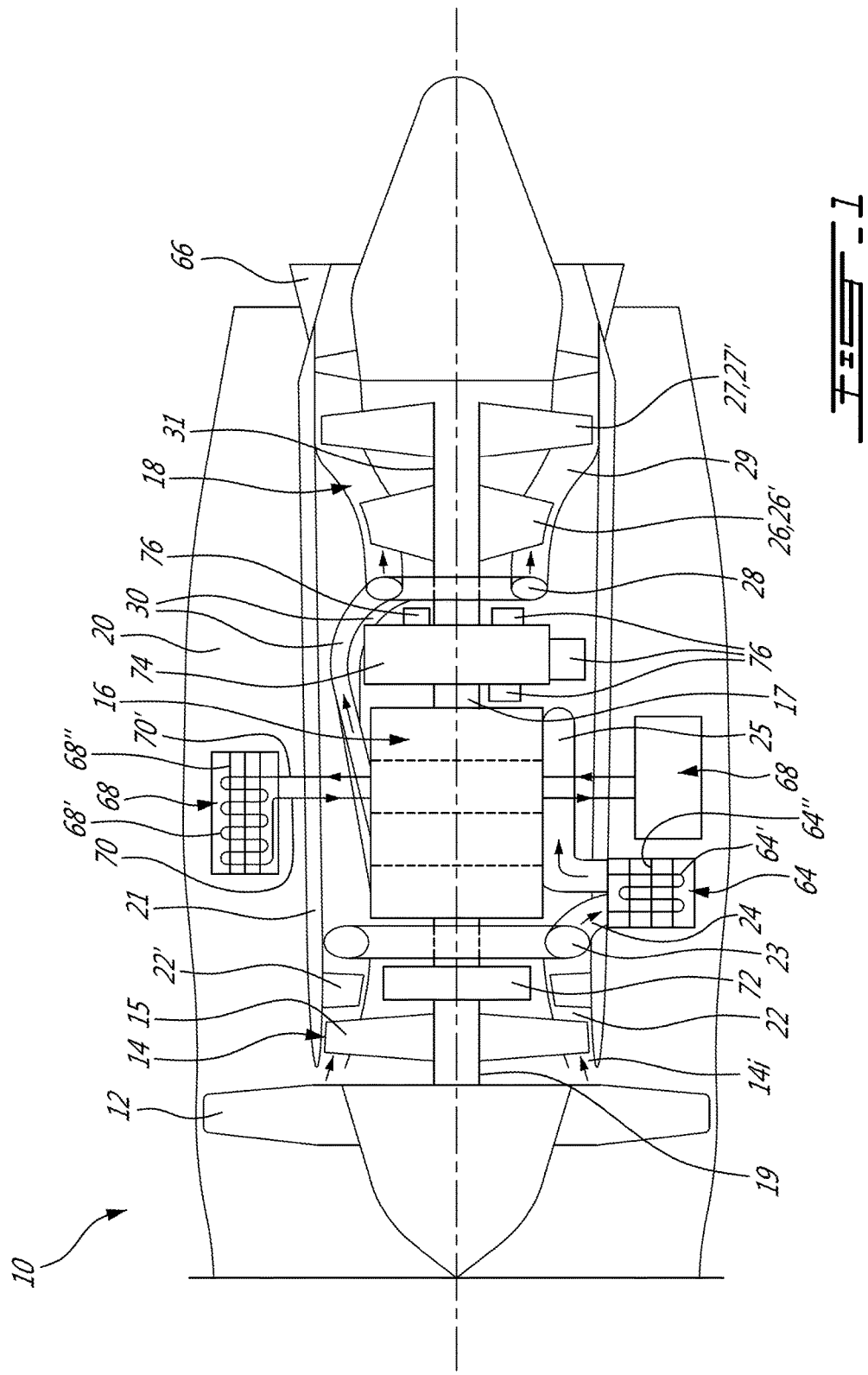
FIG. 1 is a schematic cross-sectional view of a turbofan engine assembly in accordance with a particular embodiment.

FIG. 1 illustrates a turbofan engine assembly 10 in accordance with a particular embodiment. The turbofan engine assembly 10 is of a type preferably provided for use in subsonic flight, generally comprising in serial flow communication a fan 12 through which ambient air is propelled, a compressor section 14 for pressurizing the air, one or more intermittent internal combustion engines 16 in which the compressed air is mixed with fuel and ignited, and a turbine section 18 for extracting energy from the exhaust of the internal combustion engine(s) 16. A bypass duct 20 surrounds the internal combustion engine(s) 16, compressor section 14 and turbine section 18, and the fan 12 is configured to propel air through the bypass duct 20 as well as into the inlet of the compressor section 14.

The internal combustion engine(s) 16 is/are engaged to a common engine shaft 17. In a particular embodiment, multiple internal combustion engines 16 are provided, each configured as a rotary intermittent internal combustion engine, for example of the type known as Wankel engine.

Figure 3:
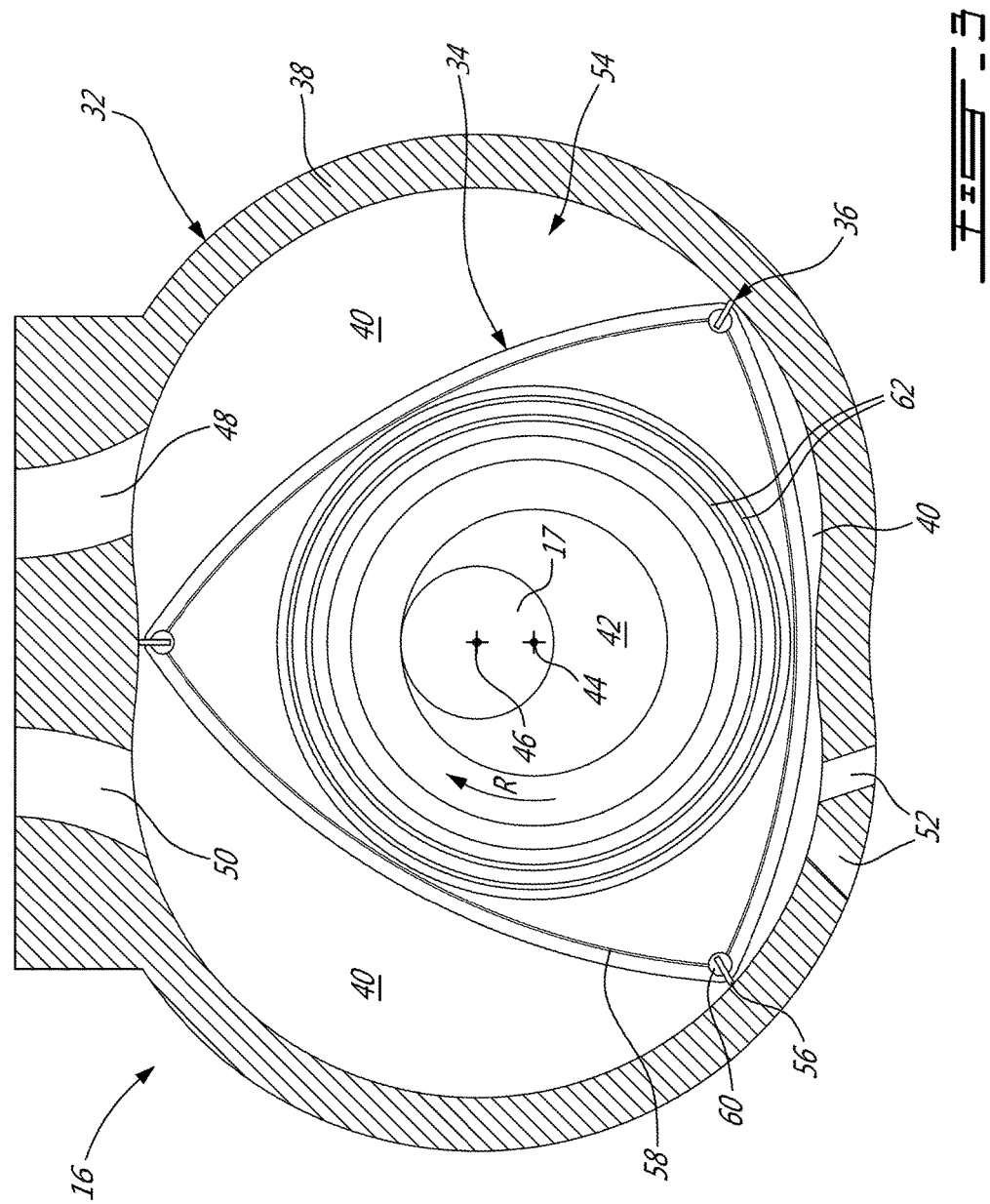
FIG. 3 is a schematic cross-sectional view of a rotary internal combustion engine which may be used in the turbofan engine assemblies of FIGS. 1-2.

Referring to FIG. 3, an example of a Wankel engine which may be used as the internal combustion engine 16 is shown. It is understood that the configuration of the engine(s) 16, e.g. placement of ports, number and placement of seals, etc., may vary from that of the embodiment shown.

The rotary internal combustion engine 16 comprises a housing 32 defining a rotor cavity having a profile defining two lobes, which is preferably an epitrochoid. A rotor 34 is received within the rotor cavity. The rotor defines three circumferentially-spaced apex portions 36, and a generally triangular profile with outwardly arched sides. The apex portions 36 are in sealing engagement with the inner surface of a peripheral wall 38 of the housing 32 to form and separate three working chambers 40 of variable volume between the rotor 34 and the housing 32. The peripheral wall 38 extends between two axially spaced apart end walls 54 to enclose the rotor cavity.

The rotor 34 is engaged to an eccentric portion 42 of an output shaft 17 to perform orbital revolutions within the rotor cavity. The output shaft 17 performs three rotations for each orbital revolution of the rotor 34. The geometrical axis 44 of the rotor 34 is offset from and parallel to the axis 46 of the housing 32. During each rotation of the rotor 34, each chamber 40 varies in volume and moves around the rotor cavity to undergo the four phases of intake, compression, expansion and exhaust.

An intake port 48 is provided through the peripheral wall 38 for admitting compressed air into one of the working chambers 40. An exhaust port 50 is also provided through the peripheral wall 38 for discharge of the exhaust gases from the working chambers 40. Passages 52 for a spark plug, glow plug or other ignition mechanism, as well as for one or more fuel injectors of a fuel injection system are also provided through the peripheral wall 38. Alternately, the intake port 48, the exhaust port 50 and/or the passages 52 may be provided through the end or side wall 54 of the housing. A subchamber (not shown) may be provided in communication with the chambers 40, for pilot or pre injection of fuel for combustion.

For efficient operation the working chambers 40 are sealed by spring-loaded peripheral or apex seals 56 extending from the rotor 34 to engage the inner surface of the peripheral wall 38, and spring-loaded face or gas seals 58 and end or corner seals 60 extending from the rotor 34 to engage the inner surface of the end walls 54. The rotor 34 also includes at least one spring-loaded oil seal ring 62 biased against the inner surface of the end wall 54 around the bearing for the rotor 34 on the shaft eccentric portion 42.

The fuel injector(s) of the engine 16, which in a particular embodiment are common rail fuel injectors, communicate with a source of Heavy fuel (e.g. diesel, kerosene (jet fuel), equivalent biofuel), and deliver the heavy fuel into the engine 16 such that the combustion chamber is stratified with a rich fuel-air mixture near the ignition source and a leaner mixture elsewhere.

Referring back to FIG. 1, the compressor section 14 of the embodiment shown includes a single axial compressor rotor 15; it is understood that alternately, multiple compressor rotors and/or other rotor configurations could be provided; for example, the compressor can be a mixed flow or centrifugal stage compressor. In a particular embodiment, the compressor 14 is configured as a boost compressor. The outlet of the compressor 14 is in fluid communication with the inlet (e.g. intake port 48) of each internal combustion engine 16. In the embodiment shown, this communication is performed through the first passage(s) 64' of an intercooler 64, as will be further detailed below.

In the embodiment shown, an annular compressor flow path 22 is defined concentric to and surrounded by the bypass duct 20, with an inner wall 21 of the bypass duct 20 separating the bypass duct 20 from the compressor flow path 22; an upstream end of the inner wall 21 is located immediately downstream of the fan 12. The compressor rotor 15 extends across the compressor flow path 22, and the portion of the compressor flow path 22 extending upstream of the compressor rotor 15 defines the compressor inlet 14i. An annular compressor outlet scroll 23 is provided in fluid communication with the compressor flow path 22, downstream of the compressor rotor 15, and defines the outlet of the compressor section 14. In the embodiment shown, vanes 22' are provided across the flow path 22 between the compressor rotor 15 and the outlet scroll 23 so as to turn the axial flow toward the circumferential flow direction defined by the scroll 23. The outlet scroll 23 communicates with the first passage(s) 64' of the intercooler 64, for example through a pipe 24 extending through the inner wall 21 of the bypass duct 20. The first passage(s) 64' in turn communicate with an inlet manifold 25 extending in proximity of the internal combustion engine(s) 16. The inlet (e.g. intake port 48) of each internal combustion engine 16 is in fluid communication with the inlet manifold 25.

The intercooler 64 is located in the bypass duct 20, and includes one or more second passage(s) 64" which are in fluid communication with the bypass duct 20. Accordingly, part of the air driven by the fan 12 to circulate through the bypass duct 20 circulates through the second passage(s) 64". The second passage(s) 64" is/are in heat exchange relationship with the first passage(s) 64' receiving the compressed air from the compressor 14, so as to be able to cool the compressed air before it is delivered to each internal combustion engine 16, using the bypass air flow of the bypass duct 20.

In the embodiment shown, additional heat exchangers 68 are located in the bypass duct 20 together with the intercooler 64. The heat exchangers 68 may be configured to receive oil and/or a coolant of the internal combustion engine(s) 16, and/or oil from the remainder of the engine assembly 10. The heat exchangers 68 may thus be in fluid communication with a coolant system of the internal combustion engine 16, and/or with a lubrication system of the internal combustion engine 16 and/or with a lubrication system of the engine assembly 10 as a whole. Inlet and outlet fluid conduits 70, 70' provide for a circulation of the coolant (e.g. liquid coolant) and/or oil to first passage(s) 68' of the heat exchangers, which are in heat exchange relationship with second passage(s) 68" receiving part of the air circulating through the bypass duct 20.

In a particular embodiment, the intercooler 64 and heat exchangers 68 located in the bypass duct 20 provide for heating of the flow through the bypass duct 20 through the heat exchanger with the air/fluid to be cooled in the intercooler 64/heat exchangers 68, which increases the potential for the bypass flow to provide thrust, which may increase the net efficiency (TSFC—Thrust Specific Fuel Consumption) of the engine assembly 10.

In the embodiment shown, the turbine section 18 includes two turbines 26, 27 each including a respective axial turbine rotor 26', 27'; it is understood that alternately, a different number of turbine rotors (one, or more than two) and/or other rotor configurations could be provided. The first turbine 26 has an inlet in fluid communication with an outlet (e.g. exhaust port 50) of each internal combustion engine 16.

In a particular embodiment, the two turbines 26, 27 have different reaction ratios from one another. Most aeronautical turbines are not "pure impulse" or "pure reaction", but rather operate following a mix of these two opposite but complementary principles—i.e. there is a pressure drop across the blades and some reduction of flow area of the turbine blades along the direction of flow (reaction), and the direction of the flow is changed in the tangential direction (impulse), so that the speed of rotation of the turbine is due to both the acceleration and the change of direction of the flow. Pure reaction turbines would have a reaction ratio of 1 (100%), while pure impulse turbine would have a reaction ratio of 0 (0%). In a particular embodiment, the first turbine 26 is configured to take benefit of the kinetic energy of the pulsating flow exiting the internal combustion engines 16 while stabilizing the flow and the second turbine 27 is configured to extract energy from the remaining pressure in the flow. Accordingly, the first turbine 26 has a lower reaction ratio (i.e. lower value) than that of the second turbine 27, so as to be closer to a "pure impulse" configuration. Alternately, the two turbines 26, 27 may have the same or similar reaction ratios.

In the embodiment shown, a turbine inlet scroll 28 is provided in fluid communication with a turbine flow path 29 through which the rotors 26', 27' of the turbines 26, 27 extend; the turbine inlet scroll 28 defines the inlet of the first turbine 26 and of the turbine section 18. A respective exhaust pipe 30 extends between the outlet (e.g. exhaust port 50) of each internal combustion engine 16 and the inlet scroll 28. In a particular embodiment, the exhaust pipes 30 communicate with the inlet scroll 28 at regularly circumferentially spaced apart locations. The exhaust pipes 30 may each communicate with a respective section of the inlet scroll 28.

The first turbine 26 has an outlet in fluid communication with an inlet of the second turbine 27; in the embodiment shown, this is obtained by having the two turbine rotors 26', 27' located in the same turbine flow path 29, with the rotor 27' of the second turbine 27 located downstream of the rotor 26' of the first turbine 26. Other configurations are also possible.

The flow from the bypass duct 20 mixes with the exhaust flow from the second turbine 27 (i.e., exhaust flow from the turbine section 18) at the downstream end of the engine assembly 10. For example, a mixer 66 may be provided at the downstream end of the inner wall 21 of the bypass duct 20 to facilitate mixing of the two flows.

In the embodiment shown, the turbofan engine assembly 10 is a single shaft assembly, i.e. the fan 12, the compressor rotor 15 and the turbine rotors 26', 27' are all drivingly engaged to the engine shaft 17. A first gearbox 72 is provided in engagement with a forward end of the engine shaft 17, and a second gearbox 74 is provided in engagement with a rear end of the engine shaft 17. The fan 12 is drivingly engaged to the engine shaft 17 via the first gearbox 72, and the turbine rotors 26', 27' are connected to a turbine shaft 31 drivingly engaged to the engine shaft 17 via the second gearbox 74. The turbines 26, 27 are accordingly compounded with the internal combustion engine(s) 16.

In the embodiment of FIG. 1, the compressor 14 is located between the internal combustion engine(s) 16 and the fan 12, and the compressor rotor 15 is also engaged to the engine shaft 17 via the first gearbox 72, such as to be rotatable at the same speed as the fan 12. The fan 12 and compressor rotor 15 are connected to a same shaft 19 engaged to the engine shaft 17 via the first gearbox 72. The first gearbox 72 is configured to increase an output speed of the fan 12 and of the compressor rotor 15 relative to an input speed of the engine shaft 17, i.e. the gearbox 72 defines a speed ratio of a rotational speed $\omega_e$ of the engine shaft 17 on a rotational speed $\omega_f$ of the fan 12 (and of the compressor rotor 15) which is smaller than 1 (i.e. $\omega_e/\omega_f<1$). In use, the rotational speed of the fan 12 and of the compressor rotor 15 is thus greater than the rotational speed of the engine shaft 17. In a particular embodiment, the speed ratio $\omega_e/\omega_f$ of the first gearbox 72 is 0.5 or approximately 0.5, i.e. the fan shaft 19 (fan 12, compressor rotor 15) rotates at a rotational speed double or approximately double the rotational speed of the engine shaft 17.

In a particular embodiment, the first gearbox 72 is configured as a single stage epicyclic gearbox. Other configurations are also possible.

In the embodiment shown, the second gearbox 74 is an accessory gearbox. The assembly 10 includes engine accessories 76 (e.g. fuel pump(s), oil pump(s), cooler pump(s), electric machine(s)) which are also engaged to the second gearbox 74. Some of the accessories 76 may rotate at different rotational speeds from one another. In a particular embodiment, the second gearbox 74 is also an epicyclic gearbox. Other configurations are also possible.

Figure 2:
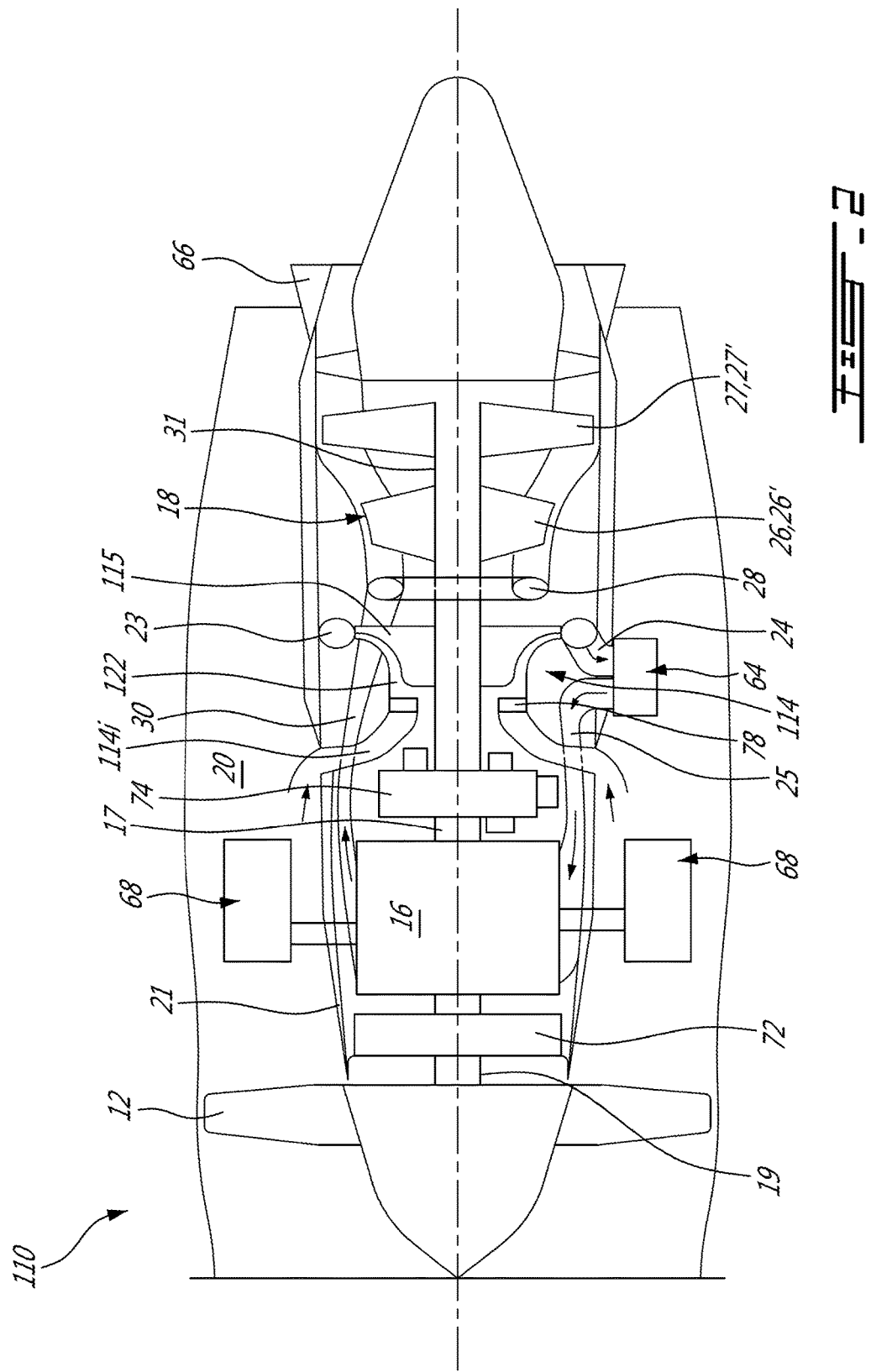
FIG. 2 is a schematic cross-sectional view of a turbofan engine assembly in accordance with another particular embodiment.

Referring to FIG. 2, a turbofan engine assembly 110 in accordance with another particular embodiment is shown, where elements similar to that of the engine assembly 10 of FIG. 1 are identified by the same reference numerals and will not be described in further detail therein.

In this embodiment, the compressor 114 is located between the internal combustion engine(s) 16 and the first turbine 26. The compressor 114 is configured as a centrifugal compressor, with the compressor flow path 122 extending radially at the compressor outlet to communicate with the compressor outlet scroll 23. It is understood that the configuration of the compressor could be different than that shown; for example, the compressor could be a single or multiple stage(s) axial or mixed flow compressor.

The compressor inlet 114$i$ is defined by a duct extending radially inwardly from a scoop or other axial component configured to raise the air pressure and located in the bypass duct 20 downstream of the internal combustion engine(s) 16. The compressor flow path 122 then turns along the axial direction adjacent the leading edge of the compressor rotor 115. Accordingly, the compressor flow path 122 extends first radially inwardly then radially outwardly from the bypass duct 20 to the compressor outlet scroll 23.

Variable inlet guide vanes 78 are optionally provided in the compressor flow path 122, upstream of the compressor rotor 115. Although not shown, variable inlet guide vanes may also be provided in the assembly of FIG. 1.

In this embodiment, the flow accordingly goes rearwardly across the compressor 114, then forwardly from the compressor outlet scroll 23 through the intercooler 64 and into the inlet of the internal combustion engine(s) 16, then rearwardly again from the internal combustion engine(s) 16 through the exhaust pipe(s) 30, turbine inlet scroll 28 and turbines 26, 27. In contrast, the flow through the engine assembly 10 of FIG. 1 goes in generally rearwardly from the compressor inlet to the turbine exhaust.

In a particular embodiment, the first gearbox 72 of the assembly 110 is configured to increase an output speed of the fan 12 relative to an input speed of the engine shaft 17, i.e. the first gearbox 72 defines a speed ratio of a rotational speed $\omega_e$ of the engine shaft 17 on a rotational speed $\omega_f$ of the fan 12 which is smaller than 1 (i.e. $\omega_e/\omega_f<1$). In use, the rotational speed of the fan 12 is thus greater than the rotational speed of the engine shaft 17, similarly to the assembly of FIG. 1.

In this embodiment however, the compressor rotor 115 is drivingly engaged to the engine shaft 17 via the second gearbox 74 so as to be rotatable at a same rotational speed as the turbine rotors 26', 27', i.e. the turbine rotors 26', 27' and the compressor rotor 115 are connected to a same shaft 31 drivingly engaged to the engine shaft 17 via the second (e.g. accessory) gearbox 74.

In a particular embodiment, the engine assembly 10, 110 allow to achieve a thermal efficiency which is superior to a gas turbine turbofan engine of a similar size.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:
1. A turbofan engine assembly comprising:
an internal combustion engine in fluid communication between a compressor and a turbine, the internal combustion engine having an engine shaft;
a bypass duct surrounding the internal combustion engine; and
a fan drivingly engaged to the engine shaft via a gearbox, the gearbox configured to increase an output speed of the fan relative to an input speed of the engine shaft.
2. The assembly as defined in claim 1, wherein a compressor rotor of the compressor is drivingly engaged to the engine shaft via the gearbox so as to be rotatable at the rotational speed of the fan.
3. The assembly as defined in claim 1, wherein the turbine is compounded with the internal combustion engine.

4. The assembly as defined in claim 3, wherein the gearbox is a first gearbox and a turbine rotor of the turbine is drivingly engaged to the shaft of the internal combustion engine via a second gearbox.

5. The assembly as defined in claim 4, wherein the second gearbox is an accessory gearbox, the assembly further comprising at least one accessory drivingly engaged to the accessory gearbox.

6. The assembly as defined in claim 4, wherein the compressor is located between the internal combustion engine and the turbine, a compressor rotor of the compressor drivingly engaged to the shaft of the internal combustion engine via the second gearbox so as to be rotatable at a same rotational speed as the turbine rotor, the compressor is a centrifugal compressor, and the an inlet of the compressor is defined by a duct extending radially inwardly from the bypass duct.

7. The assembly as defined in claim 1, wherein the internal combustion engine is a Wankel rotary engine including an engine rotor having three apex portions mounted for eccentric revolutions within an internal cavity defined in a housing, the internal cavity having an epitrochoid shape with two lobes.

8. The assembly as defined in claim 1, further comprising a heat exchanger located in the bypass duct, the heat exchanger in fluid communication with a coolant system of the internal combustion engine.

9. The assembly as defined in claim 1, further comprising at least one additional internal combustion engine in fluid communication between the compressor and the turbine.

10. The assembly as defined in claim 1, wherein the turbine is a first turbine, the assembly further comprising a second turbine having an inlet in fluid communication with an outlet of the first turbine.

11. A turbofan engine assembly comprising:
a compressor;
a plurality of rotary internal combustion engines each including an engine rotor having three apex portions mounted for eccentric revolutions within an internal cavity defined in a housing, the internal cavity having an epitrochoid shape with two lobes, the rotary internal combustion engines having an inlet in fluid communication with an outlet of the compressor through at least one first passage of an intercooler;
a turbine having an inlet in fluid communication with an outlet of the rotary internal combustion engines;
a bypass duct surrounding the rotary internal combustion engines, compressor and turbine; and
a fan configured to propel air through the bypass duct and through an inlet of the compressor, the fan drivingly engaged to a shaft of the rotary internal combustion engines via a gearbox, the gearbox defining a speed ratio of a rotational speed of the shaft of the rotary internal combustion engines on a rotational speed of the fan, the speed ratio being smaller than 1 so that the gearbox defines a speed increase from the shaft of the rotary internal combustion engines to the fan.

12. The assembly as defined in claim 11, wherein a compressor rotor of the compressor is drivingly engaged to the shaft of the internal combustion via the gearbox so as to be rotatable at the rotational speed of the fan.

13. The assembly as defined in claim 11, wherein the turbine is compounded with the rotary internal combustion engines.

14. The assembly as defined in claim 13, wherein the gearbox is a first gearbox and a turbine rotor of the turbine is drivingly engaged to the shaft of the rotary internal combustion engines via a second gearbox.

15. The assembly as defined in claim 14, wherein the second gearbox is an accessory gearbox, the assembly further comprising at least one accessory drivingly engaged to the accessory gearbox.

16. The assembly as defined in claim 14, wherein the compressor is located between the rotary internal combustion engines and the turbine, a compressor rotor of the compressor drivingly engaged to the shaft of the rotary internal combustion engines via the second gearbox so as to be rotatable at a same rotational speed as the turbine rotor, the compressor is a centrifugal compressor, and the compressor inlet is defined by a duct extending radially inwardly from the bypass duct.

17. The assembly as defined in claim 11, further comprising a heat exchanger located in the bypass duct, the heat exchanger in fluid communication with a coolant system of the rotary internal combustion engines.

18. The assembly as defined in claim 11, wherein the turbine is a first turbine, the assembly further comprising a second turbine having an inlet in fluid communication with an outlet of the first turbine.

19. A method of driving a fan of a turbofan engine assembly, the method comprising:
rotating a shaft with an internal combustion engine of the turbofan engine assembly; and
driving the fan with the shaft of the internal combustion engine via a gearbox of the turbofan engine assembly, the gearbox configured so that the fan is rotated at a greater rotational speed than that of the shaft.

20. The method as defined in claim 19, wherein the internal combustion engine is a Wankel rotary engine including a rotor having three apex portions mounted for eccentric revolutions within an internal cavity defined in a housing, the internal cavity having an epitrochoid shape with two lobes.

\* \* \* \* \*